United States Patent
Morris et al.

(10) Patent No.: US 12,523,282 B2
(45) Date of Patent: Jan. 13, 2026

(54) SLEEVE FOR AN AXLE SHAFT ASSEMBLY

(71) Applicant: Allison Transmission, Inc., Indianapolis, IN (US)

(72) Inventors: Austin Morris, Avon, IN (US); Thomas D. Buono, Macomb, MI (US)

(73) Assignee: Allison Transmission, Inc., Indianapolis, IN (US)

(*) Notice: Subject to any disclaimer, the term of this patent is extended or adjusted under 35 U.S.C. 154(b) by 362 days.

(21) Appl. No.: 18/073,837

(22) Filed: Dec. 2, 2022

(65) Prior Publication Data

US 2024/0181810 A1 Jun. 6, 2024

(51) Int. Cl.
| | |
|---|---|
| *F16H 48/24* | (2006.01) |
| *B60K 23/04* | (2006.01) |
| *F16D 11/00* | (2006.01) |
| *F16H 48/08* | (2006.01) |
| *F16H 48/32* | (2012.01) |

(52) U.S. Cl.
CPC ........ *F16H 48/24* (2013.01); *B60K 2023/046* (2013.01); *F16D 2011/004* (2013.01); *F16D 2011/008* (2013.01); *F16H 48/08* (2013.01); *F16H 48/32* (2013.01)

(58) Field of Classification Search
CPC ........ F16D 2011/004; F16D 3/06; F16D 1/10; F16D 1/0876–0888; F16D 2001/103; F16H 48/24; F16H 48/32; F16H 2048/305; B60K 17/043–046; B60K 2007/0092; B62M 11/14–18; B60B 35/122–125
See application file for complete search history.

(56) References Cited

U.S. PATENT DOCUMENTS

| | | | | |
|---|---|---|---|---|
| 1,530,205 | A | * | 3/1925 | Ruckstell ............ F16H 57/028 475/314 |
| 4,327,821 | A | * | 5/1982 | Telford ................ F16D 11/14 192/93 R |
| 5,394,967 | A | * | 3/1995 | Bigley ................. F16D 11/14 192/93 R |
| 5,647,686 | A | | 7/1997 | Hancock et al. |
| 5,727,430 | A | | 3/1998 | Valente |

(Continued)

FOREIGN PATENT DOCUMENTS

| | | | | |
|---|---|---|---|---|
| CN | 104421398 | A * | 3/2015 | ............ F16H 48/24 |
| CN | 207661087 | U | 7/2018 | |

(Continued)

*Primary Examiner* — James J Taylor, II

(74) *Attorney, Agent, or Firm* — Faegre Drinker Biddle & Reath LLP

(57) ABSTRACT

A sleeve for an axle shaft assembly, which may be found in an automotive transmission, is provided. The sleeve includes a body that defines an axis of rotation about which the body is radially symmetric, an inner surface, and an outer surface. The body includes a first set of splines, a second set of splines, and a chamfered edge. The first set of splines protrude outward from the outer surface, and the first set of splines are spaced apart about the axis of rotation. The second set of splines protrude outward from the outer surface, and are spaced apart about the axis of rotation. The first set of splines is axially spaced apart from the second set of splines, along the axis of rotation. The chamfered edge extends from a leading edge of the first set of splines toward the outer surface, between the first and second set of splines.

22 Claims, 10 Drawing Sheets

(56) References Cited

U.S. PATENT DOCUMENTS

| | | | |
|---|---|---|---|
| 6,348,001 B2 | 2/2002 | Killop | |
| 6,517,462 B2 * | 2/2003 | Borgan | B60K 17/34 |
| | | | 475/230 |
| 6,659,249 B2 * | 12/2003 | Borgen | F16D 1/02 |
| | | | 475/222 |
| 7,096,990 B2 * | 8/2006 | Borgen | B60K 23/08 |
| | | | 180/24.09 |
| 9,328,775 B2 * | 5/2016 | Schoolcraft | F16D 11/08 |
| 10,113,629 B2 | 10/2018 | Adragna et al. | |
| 10,941,816 B2 * | 3/2021 | Kajikawa | B60K 5/02 |
| 11,614,148 B2 * | 3/2023 | Chandrashekar | F16H 3/093 |
| | | | 74/331 |
| 11,614,152 B2 * | 3/2023 | Roberts | F16H 48/32 |
| | | | 475/138 |

FOREIGN PATENT DOCUMENTS

| | | | | |
|---|---|---|---|---|
| CN | 112833159 A | | 5/2021 | |
| DE | 1948616 A1 * | | 4/1971 | |
| DE | 102015210227 A1 * | | 12/2016 | |
| GB | 1013142 A | | 12/1965 | |
| WO | WO-2023241826 A2 * | | 12/2023 | B60K 17/00 |

\* cited by examiner

SLEEVE FOR AN AXLE SHAFT ASSEMBLY

TECHNICAL FIELD

The present application relates generally to sleeves, and more specifically, to lock sleeves that may be used with axle shaft assemblies, such as axle shaft assemblies of drive axles.

BACKGROUND

Sleeves may be used in a variety of contexts. In some examples, sleeves may be used in axle shaft assemblies to transmit torque, through a differential. When a first axle shaft is locked to a second axle shaft, torque may be applied equally when both wheels are rotating at the same speed. Torque may be applied fully to one axle shaft when the other axle shaft is spinning freely.

SUMMARY

Aspects of the present disclosure relate generally to a sleeve, such as a sleeve for an axle shaft assembly, which may be found in an automotive transmission. Generally, in an axle shaft assembly, an amount of stroke for a shift fork may be limited by dimensions of an axle housing opening and gear housing of the axle shaft assembly. The sleeve provided herein may accommodate the limited space for the shift fork stroke, by providing a first set of splines and a second set of splines that extend outward from a circumferential surface of the sleeve, are each spaced apart about an axis of rotation of the sleeve, and that are spaced apart from each other, along the axis of rotation. The first and second set of splines cooperate to double an amount of spline engagement for a given length (e.g., one millimeter) of stroke, thereby improving an axle shaft assembly's fatigue life.

In some examples, a sleeve for an axle shaft is provided, The sleeve includes a cylindrical body. The cylindrical body defines an axis of rotation about which the cylindrical body is radially symmetric, an inner circumferential surface, and an outer circumferential surface. The cylindrical body includes a first set of splines, a second set of splines, and a chamfered edge. The first set of splines protrude outward from the outer circumferential surface, and the first set of splines are spaced apart about the axis of rotation. The second set of splines protrude outward from the outer circumferential surface. The second set of splines are spaced apart about the axis of rotation. The first set of splines is axially spaced apart from the second set of splines, along the axis of rotation. The chamfered edge extends from a leading edge of the first set of splines toward the outer circumferential surface, between the first and second set of splines.

In some examples, the cylindrical body further includes a third set of splines. The third set of splines protrude inward from the inner circumferential surface, and the third set of splines are spaced apart about the axis of rotation.

In some examples, the third set of splines extend continuously across the cylindrical body, with respect to the axis of rotation.

In some examples, the inner circumferential surface defines a cavity within the cylindrical body. The axis of rotation extends through the cavity.

In some examples, the first set of splines and the second set of splines protrude outward from the outer circumferential surface to substantially the same height.

In some examples, the first set of splines and the second set of splines define a valley in the space between which they are apart. The chamfered edge forms a portion of the valley.

In some examples, a sleeve for an axle shaft is provided. The sleeve includes a cylindrical body. The cylindrical body defines an axis of rotation about which the cylindrical body is radially symmetric, an inner circumferential surface, and an outer circumferential surface. The cylindrical body includes a first set of splines, a second set of splines, and a third set of splines. The first set of splines protrude outward from the outer circumferential surface, and the first set of splines are spaced apart about the axis of rotation. The second set of splines protrude outward from the outer circumferential surface. The second set of splines are spaced apart about the axis of rotation. Further, the first set of splines is axially spaced apart from the second set of splines, along the axis of rotation. The third set of splines protrude inward from the inner circumferential surface, and the third set of splines are spaced apart about the axis of rotation.

In some examples, the cylindrical body further includes a chamfered edge. The chamfered edge extends from a leading edge of the first set of splines toward the outer circumferential surface, between the first and second set of splines.

In some examples, the third set of splines extend continuously across the cylindrical body, with respect to the axis of rotation.

In some examples, the inner circumferential surface defines a cavity within the cylindrical body. The axis of rotation extends through the cavity.

In some examples, the first set of splines and the second set of splines protrude outward from the outer circumferential surface to substantially the same height.

In some examples, the first set of splines and the second set of splines define a valley in the space between which they are apart.

In some examples, an axle shaft assembly is provided. The axle shaft assembly includes a carrier flange and a sleeve. The carrier flange is positioned about an axle shaft. The carrier flange includes a first set of splines and a second set of splines. The sleeve is positioned about the axle shaft. The sleeve includes a body that defines an inner surface and an outer surface. The body includes a third set of splines and a fourth set of splines. The third set of splines protrude outward from the outer surface, and the third set of splines are spaced apart about the carrier flange. The fourth set of splines protrude outward from the outer surface. The fourth set of splines are spaced apart about the carrier flange. The third set of splines are axially spaced apart from the fourth set of splines, along a length of the axle shaft. The third set of splines and the fourth set of splines are configured to engage with the first set of splines and the second set of splines, respectively.

In some examples, the body further includes a chamfered edge, the chamfered edge extends from a leading edge of the third set of splines toward the outer surface, between the third and fourth set of splines.

In some examples, the chamfered edge is configured to engage the first set of splines with the third set of splines, before the second set of splines engages with the fourth set of splines.

In some examples, the first set of splines are axially spaced apart from the second set of splines, along the length of the axle shaft.

In some examples, the inner surface defines a cavity within the body. The axle shaft extends through the cavity.

In some examples, the axle shaft assembly further includes a piston that is configured to move between a first position and a second position, and a shift fork that is coupled to the piston and to the sleeve. The shift fork is configured to move the sleeve, when the piston moves between the first position and the second position, thereby locking or unlocking the sleeve with the carrier flange.

In some examples, the axle shaft is a first axle shaft, and the axle shaft assembly further includes a second axle shaft. The sleeve is configured to transmit torque from the first axle shaft to the second axle shaft, via the carrier flange, when the sleeve is locked with the carrier flange.

In some examples, the body of the sleeve is a cylindrical body, the inner surface is an inner circumferential surface, and the outer surface is an outer circumferential surface.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters may indicate corresponding parts throughout the several views. Unless stated otherwise the drawings are proportional and drawn to scale.

DETAILED DESCRIPTION OF THE DRAWINGS

Figure 1:
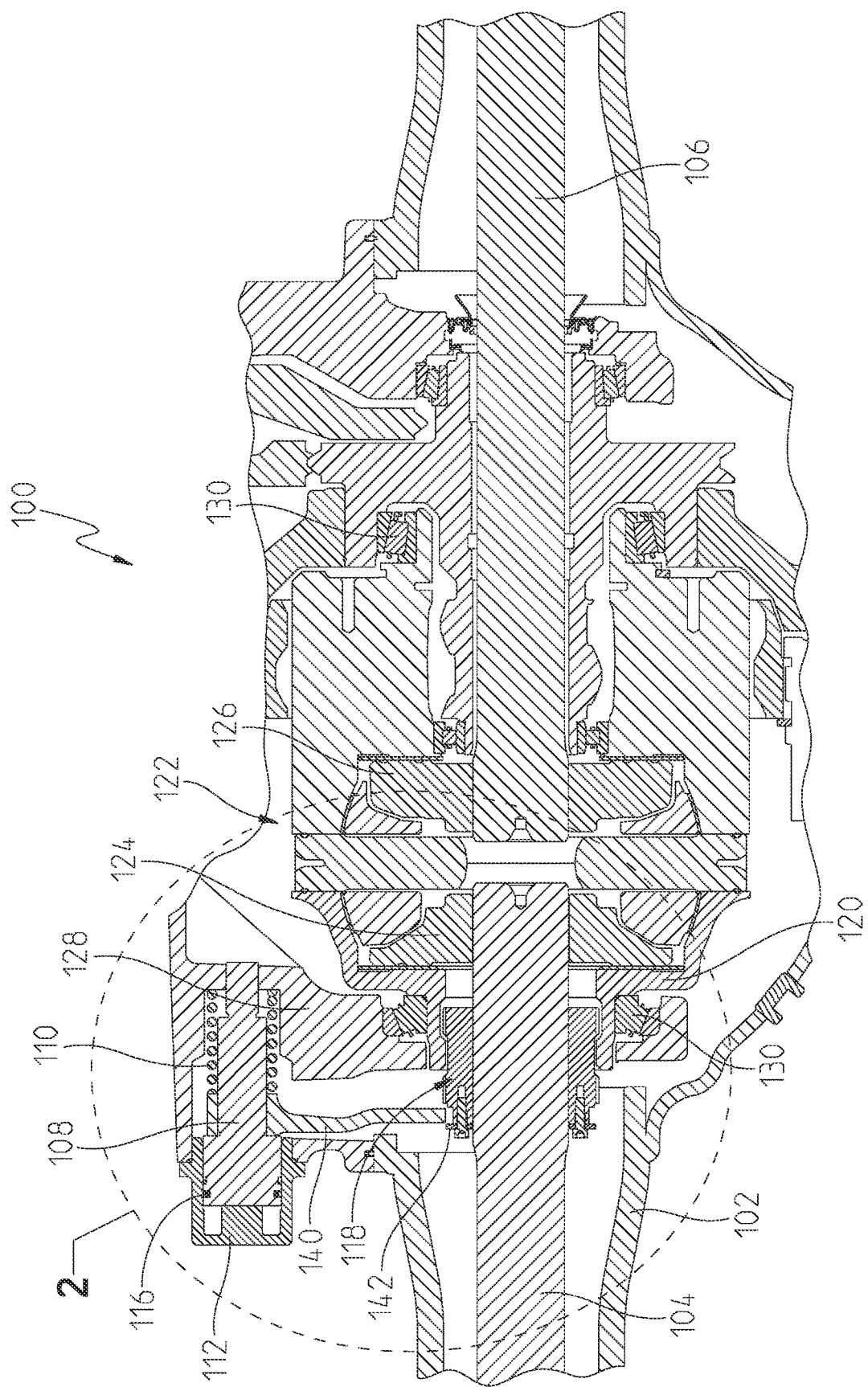
FIG. 1 illustrates a front cross-sectional elevation view of an axle shaft assembly, according to some aspects described herein.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While the structures and components disclosed herein may be embodied in many different forms, several specific embodiments are discussed herein with the understanding that the embodiments described in the present disclosure are to be considered only exemplifications of the principles described herein, and the disclosure is not intended to be limited to the embodiments illustrated. Further, throughout the disclosure, the terms "about", "substantially", and "approximately" mean plus or minus 5% of the number or geometric constraint that each term precedes. For example, about 100 may mean 100+/5. Additionally, or alternatively, substantially orthogonal may mean that any 90 degree angle related to the described orthogonality may be between 85.5 degrees and 94.5 degrees (inclusive).

As mentioned above, sleeves may be used in a variety of contexts. In some examples, sleeves may be used in axle shaft assemblies to transmit torque from a first axle shaft, about which the sleeve is disposed, to a second axle shaft. The torque may be transmitted through a differential of the axle shaft assembly. The sleeve may include splines that engage with corresponding splines of a carrier flange of the differential to transmit torque therethrough. However, an amount of stroke for a shift fork may be limited by dimensions of an axle housing opening and gear housing of the axle shaft assembly. Such limitations in dimensions may be due to standardized sizes of vehicle components, such as vehicle chassis. Therefore, due to the limitations of the shift fork stroke distance, an engagement between the splines of the sleeve and the splines of the carrier flange is also limited.

Accordingly, there exists a need to improve engagement between the sleeve and the carrier flange to effectively transmit torque through the differential (e.g., from the first axle shaft to the second axle shaft). It is with respect to these and other general considerations that embodiments have been described. Also, although relatively specific problems have been discussed, it should be understood that the embodiments should not be limited to solving the specific problems identified herein.

Aspects of the present disclosure can be advantageous to address the above problems, as well as additional problems that may be recognized by those of ordinary skill in the art. Generally, as explained herein, the present disclosure provides a sleeve, such as, for example, a sleeve for an axle shaft assembly. A sleeve made in accordance with aspects of the present disclosure provides improved engagement between an axle shaft and a carrier flange, such as when facing a limited stroke length for the sleeve to engage the carrier flange.

Figure 4:
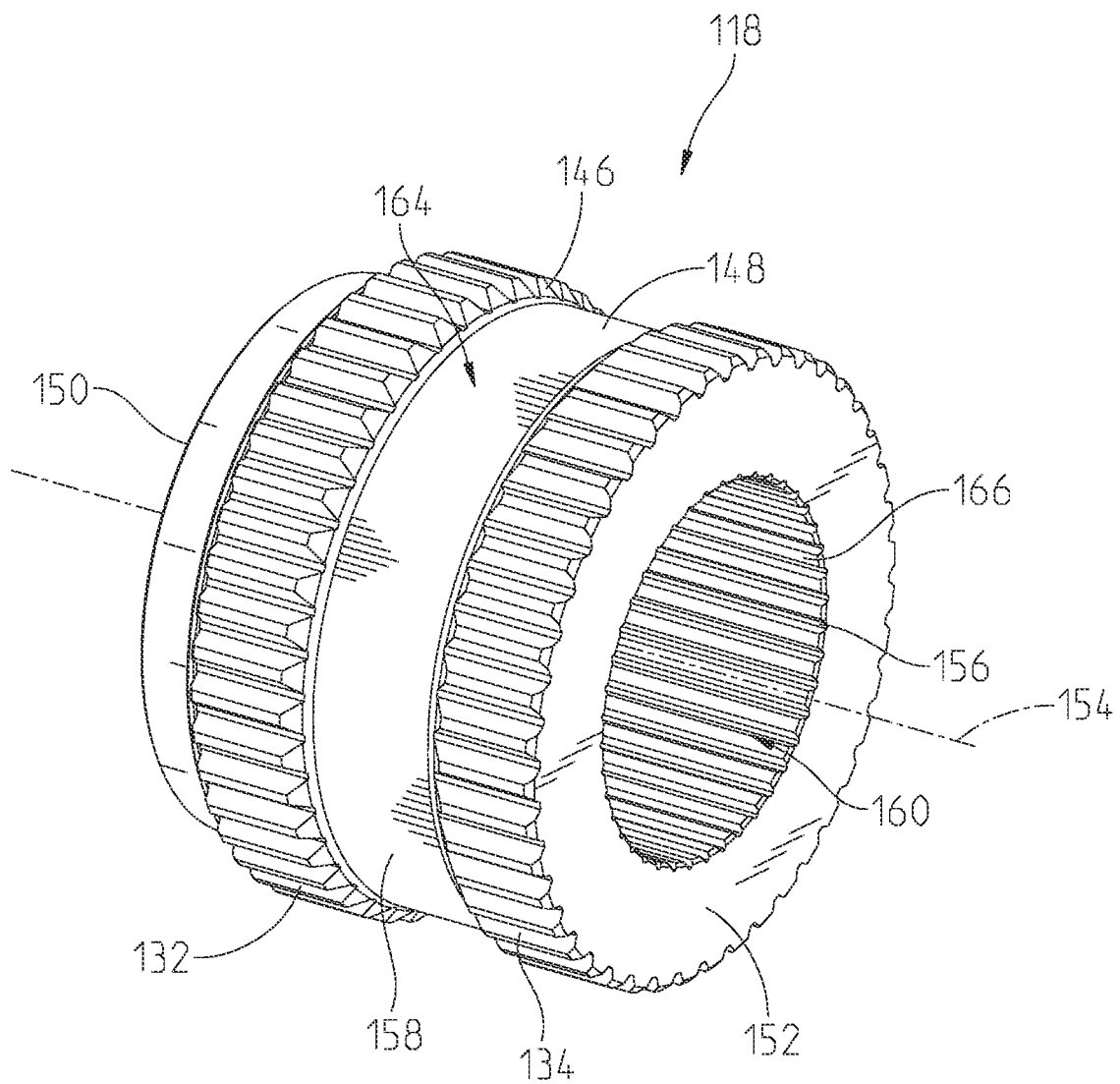
FIG. 4 illustrates a top, front, and left isometric view of the sleeve of FIG. 3A, according to some aspects described herein.
Figure 5:
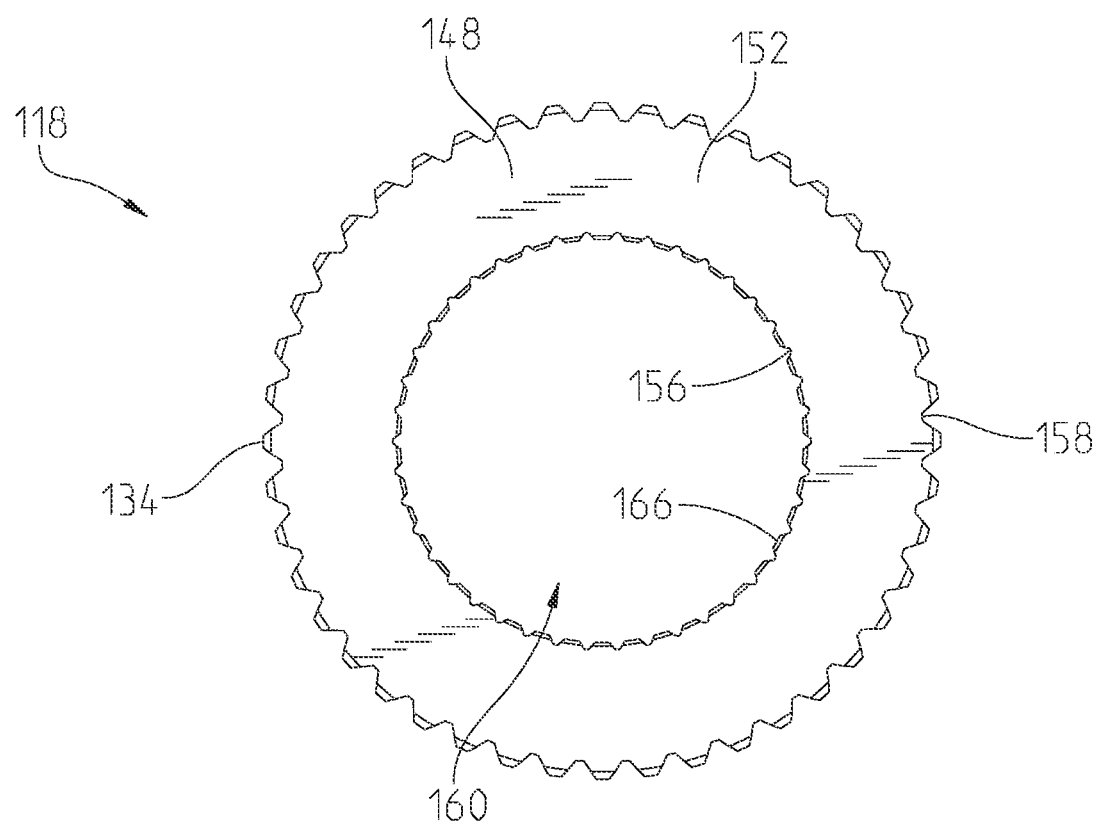
FIG. 5 illustrates a left-side elevational view of the sleeve of FIG. 3A, according to some aspects described herein.
Figure 7:
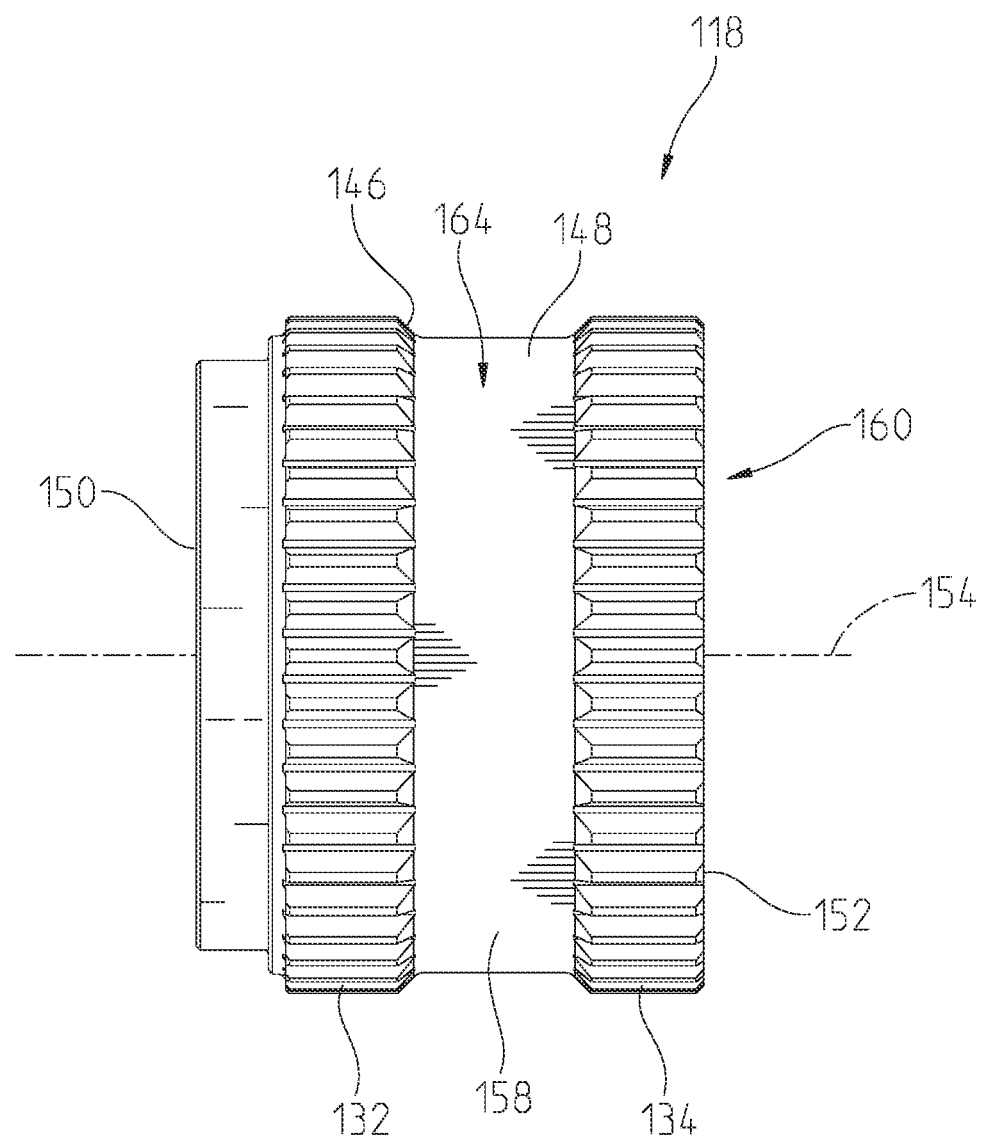
FIG. 7 illustrates a front elevation view of the sleeve of FIG. 3A, according to some aspects described herein.

For example, the sleeve may include a cylindrical body that defines an axis of rotation about which the cylindrical body is radially symmetric, an inner circumferential surface, and an outer circumferential surface. The cylindrical body may include first and second sets of splines that protrude outward from the outer circumferential surface. Each set of splines includes a plurality of splines that are each spaced apart from one another and distributed about the axis of rotation, as shown in FIGS. 4 and 5 for example. The first and second sets of splines may further be axially spaced apart from each other, along the axis of rotation (e.g., defining a valley 164 between the first and second sets of splines), as shown in FIGS. 4 and 7 for example. Further, a chamfered edge may extend from the first set of splines to the outer circumferential surface, between the first and second sets of splines, to initially engage the carrier flange, and reduce blockage in the valley between the first and second sets of splines, such as from dust or debris.

FIG. 1 illustrates a front cross-sectional view of an axle shaft assembly 100. The axle shaft assembly 100 includes an axle shaft housing 102 that encloses a first axle shaft 104 and a second axle shaft 106. The first axle shaft 104 and the second axle shaft 106 are generally cylindrical. In some examples, the first and second axle shafts 104, 106 may be moving at the same speed (e.g., when locked together). Alternatively, in some examples, the first and second axle shafts 104, 106 may be moving at different speeds (e.g., when not locked together). One of ordinary skill should recognize that when the conditions of operation are different for each of the axle shafts 104, 106, they may consequently be moving at different speeds, such as when a vehicle including axle shaft assembly is cornering such that left and right wheels respectively fixed to the axle shafts 104, 106 are turning at different speeds. Wheel slippage may also cause differing speeds between the two axle shafts 104, 106. By contrast, when the conditions of operation are the same for both of the axle shafts 104, 106, the axle shafts 104, 106 may consequently be moving at the same speeds. This is the case when the vehicle is tracking straight and the left and right wheels are therefore turning at the same speeds, for example.

The axle shaft assembly 100 includes a piston 108 that is configured to move between a first position and a second position. The axle shaft assembly 100 further includes a biasing member or spring 110 that is received about at least a portion of the piston 108 to return the piston 108 in one direction between the first position and the second position. A cap 112 is sized and configured to receive and locate the piston 108. The cap 112 may include a fitting 114 extending therethrough (see FIG. 9), such as a pneumatic fitting. Accordingly, air may be input into the cap 112, through the fitting 114, to change a pressure within the cap 112, thereby actuating the piston 108 in the other direction between the first position and the second position. Thus, piston 108 utilizes pneumatic actuation with a spring return, though other configurations may of course be utilized as required or desired for a particular application. Further, a seal 116 may extend about (e.g., entirely about) the piston 108 to seal air within the cap 112 (e.g., preventing air from escaping from the cap 112), by passing along the piston 108.

The axle shaft assembly 100 further includes a sleeve 118. The sleeve 118 may be a lock sleeve that locks the rotation of the first axle shaft 104 with the rotation of the second axle shaft 106, such as to match a rotation speed of the second axle shaft 106 with a rotation speed of the first axle shaft 104. When so locked, torque is applied equally to axle shaft 104 and axle shaft 106, and vice-versa when both wheels are rotating at the same speed. Torque is applied fully to axle shaft 104 when axle shaft 106 is spinning freely, and vice-versa. The axle shaft assembly 100 includes a carrier flange 120 that engages with the sleeve 118 to lock the rotation of the first axle shaft 104 with the rotation of the second axle shaft 106. The carrier flange 120 may be part of a differential 122 that further includes a plurality of gears, such as a first side gear 124 and a second side gear 126. The carrier flange 120 extends about the first axle shaft 104. For example, the first axle shaft 104 may be inserted into a hole formed by the carrier flange 120, when the first axle shaft 104 is assembled with the carrier flange 120.

While in the illustrated example the carrier flange 120 engages with the sleeve 118 to lock the first axle shaft 104 with the second axle shaft 106 it should be recognized by those of ordinary skill in the art that alternative configurations may be used to lock the first and second axle shafts 104, 106 together, via actuation of the sleeve 118, as further described below. For example, in a first position, the sleeve 118 may be solely disposed about the first axle shaft 104, and in a second position, the sleeve 118 may be disposed about both the first axle shaft 104 and the second axle shaft 106. Additional and/or alternative examples will be recognized by those of ordinary skill in the art for locking a first axle shaft with a second axle shaft using mechanisms provided herein.

The axle shaft assembly 100 includes a gear housing 128 that encloses the differential 122. Further, the piston 108 and the spring 110 may be contained at least partially within the gear housing 128. The cap 112 that receives and locates the piston 108 may be coupled to the gear housing 128 (e.g., via fasteners, adhesive, snappable attachment, threaded attachment, etc.). Further, a plurality of bearings 130 may be disposed along the gear housing 128 to couple neighboring components thereto.

Figure 2:
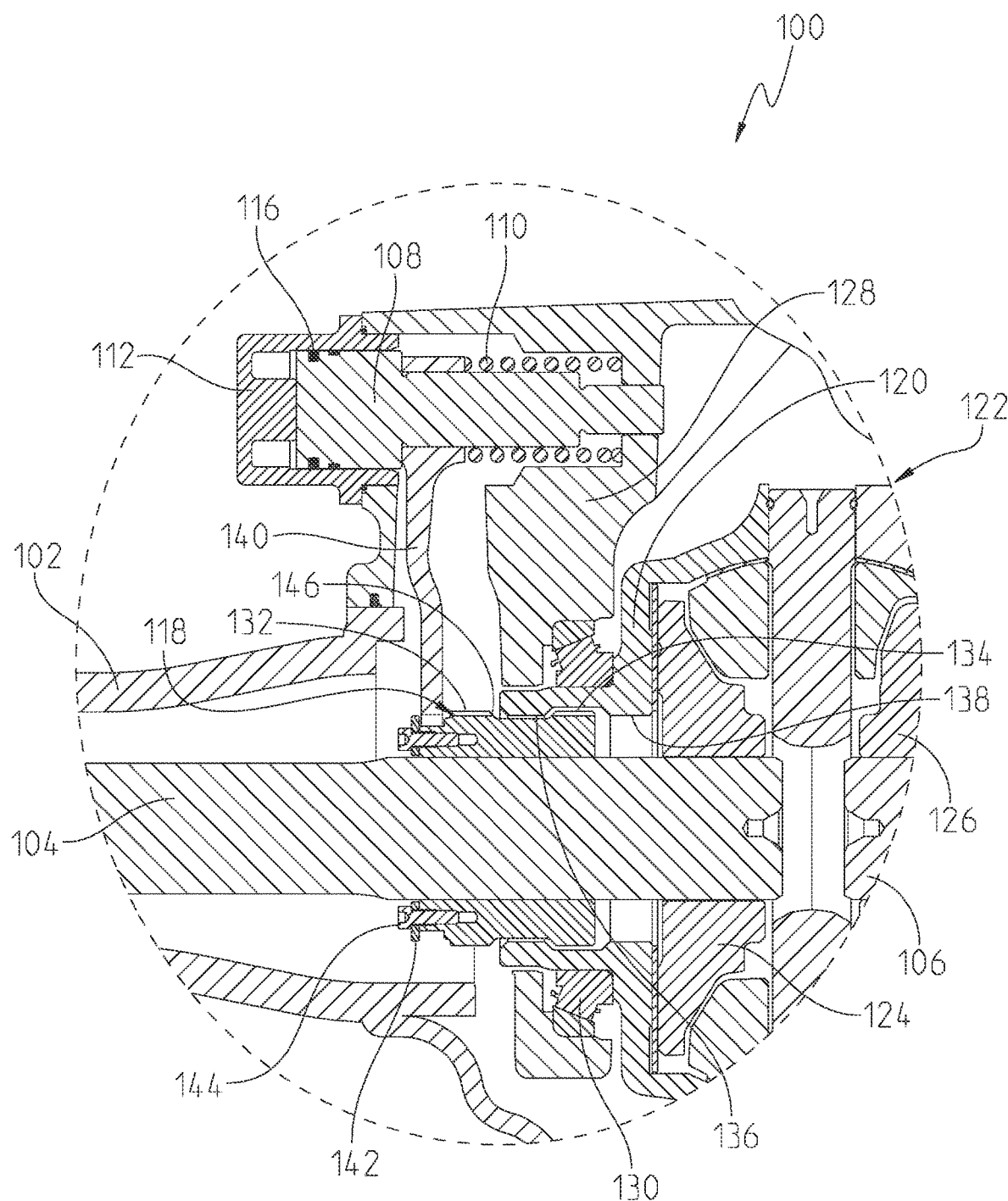
FIG. 2 illustrates an enlarged front cross-sectional elevation view of a portion of the axle shaft assembly of FIG. 1.

FIG. 2 illustrates an enlarged front cross-sectional elevation view of a portion of the axle shaft assembly 100. As shown in FIG. 2, the sleeve 118 includes a first set of splines 132 and a second set of splines 134. The carrier flange 120 includes a third set of splines 136 and a fourth set of splines 138 that are arranged to engage with the first and second sets of splines 132, 134 of the sleeve 118, respectively.

While the illustrated example includes two corresponding sets of splines (e.g., first and second sets of splines 132, 134 of the sleeve 118 and third and fourth sets of splines 136, 138 of the carrier flange 120), it should be recognized by those of ordinary skill in the art that mechanisms taught herein for improving engagement between the sleeve 118 and the carrier flange 120 may include three corresponding sets of splines, or four corresponding sets of splines, or any number of corresponding sets of splines greater than singular corresponding sets of splines.

The axle shaft assembly 100 includes a shift fork or fork 140 that extends from the piston 108 to the sleeve 118. The shift fork 140 is coupled to the piston 108 and to the sleeve 118. The shift fork 140 extends about the piston 108 on a first end and is received by the sleeve 118 at a second end (e.g., that is opposite of the first end). In some examples, the piston 108 extends through a hole in the shift fork 140, when assembled therewith.

The shift fork 140 extends between the gear housing 128 and the axle shaft housing 102. An end plate 142 is coupled to the sleeve 118 (e.g., via one or more fasteners 144). The end plate 142 couples the shift fork 140 to the sleeve 118. For example, when the piston 108 shifts from a first position to a second position, the shift fork 140, which is coupled to the piston 108, correspondingly shifts from a first position to a second position, thereby engaging (e.g., locking) or disengaging (e.g., unlocking) the sleeve 118 with the carrier flange 120.

Figure 3A:
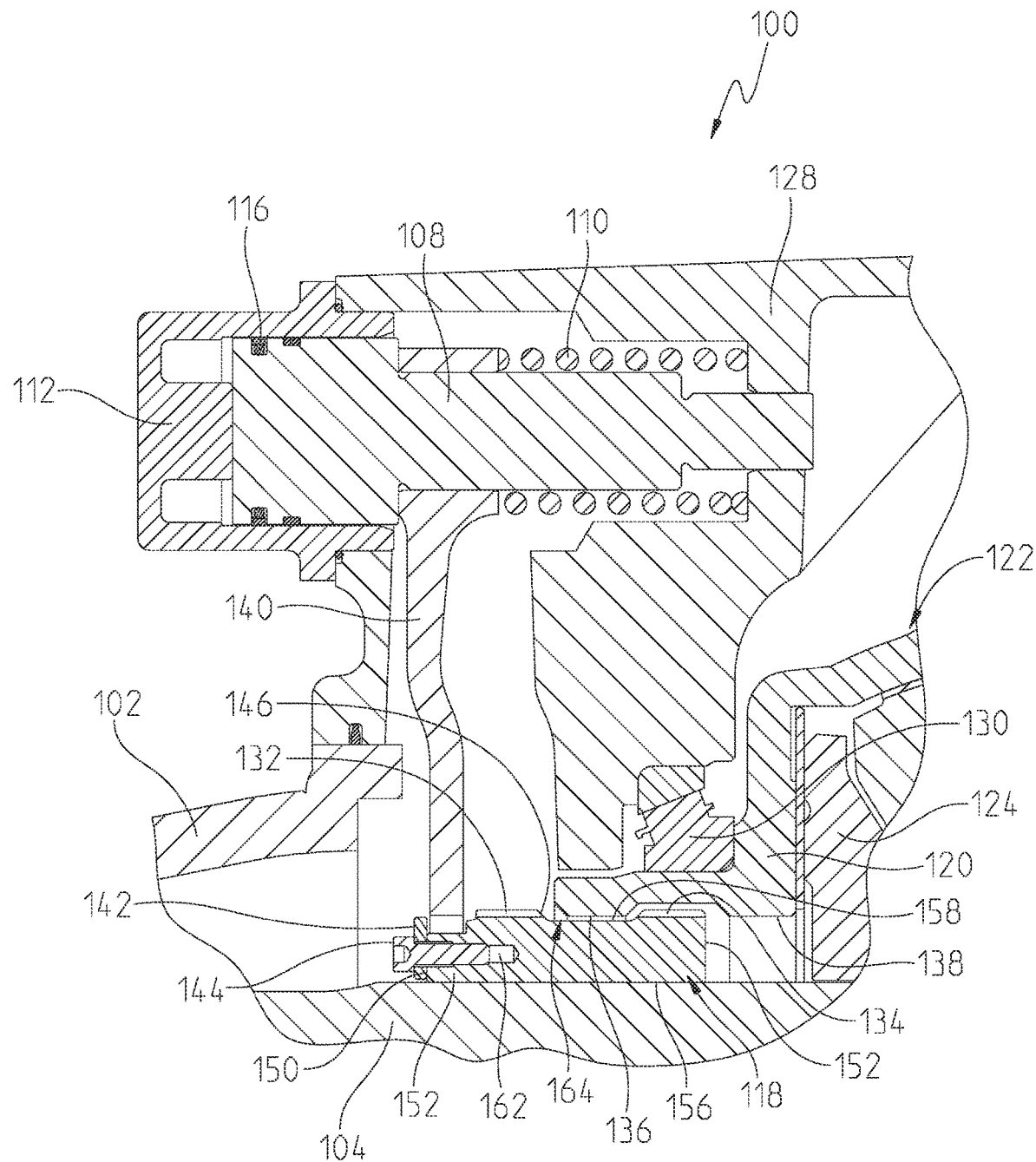
FIG. 3A illustrates a front cross-sectional view of a sleeve, of the axle shaft assembly of FIG. 1, in a disengaged position, according to some aspects described herein.
Figure 3B:
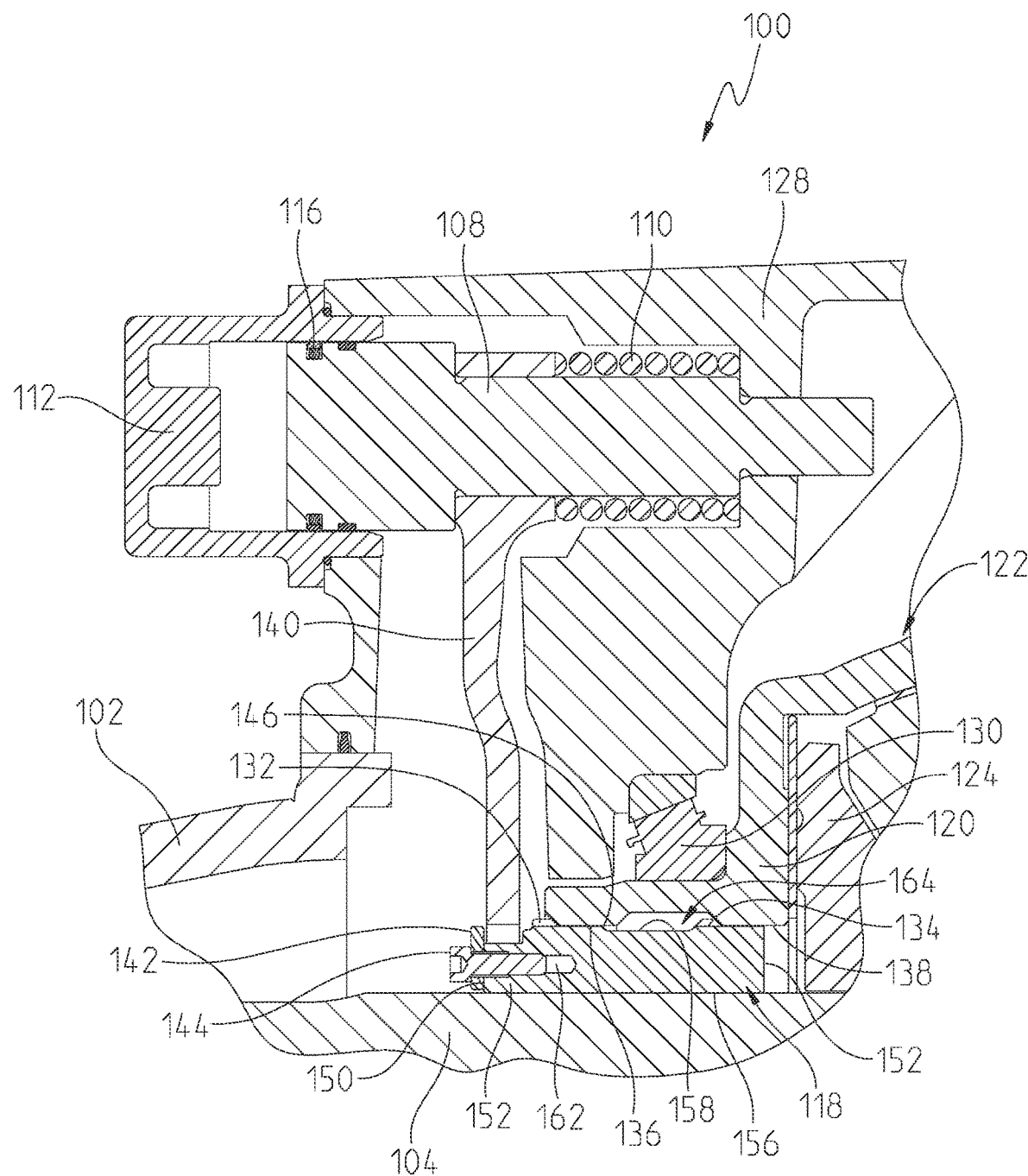
FIG. 3B illustrates a front cross-sectional view of the sleeve of FIG. 3A in an engaged position, according to some aspects described herein.

FIG. 3A illustrates a front cross-sectional view of the piston 108, shift fork 140 and sleeve 118 in a first or disengaged position, and FIG. 3B illustrates a front cross-sectional view of the piston 108, shift fork 140 and sleeve 118 in a second or engaged position, according to some aspects described herein.

In some examples, the disengaged and engaged positions are with respect to the carrier flange 120. For example, the first and second sets of splines 132, 134 of the sleeve 118 may respectively engage with the third and fourth sets of splines 136, 138 of the carrier flange 120, when in the engaged position. Comparatively, the first and second sets of splines 132, 134 of the sleeve 118 may be disengaged and spaced from the third and fourth sets of splines 136, 138 of the carrier flange 120, when in the disengaged position.

The chamfered edge 146 of the sleeve 118 along the first set of splines 132 of the sleeve 118 is configured to engage the third set of splines 136 of the carrier flange 120, before the second set of splines 134 of the sleeve 118 engages with the fourth set of splines 138 of the carrier flange 120. For example, a distance between the third and fourth sets of splines 136, 138 of the carrier flange 120 may be larger than a distance between the first and second sets of splines 132, 134 of the sleeve 118, such that the first set of splines 132 of the sleeve 118 can engage the third set of splines 136 of the carrier flange 120, prior to the second set of splines 134 of the sleeve 118 engaging the fourth set of splines 138 of the carrier flange 120.

One of ordinary skill in the art will recognize that in FIG. 3B, the respective splines of sleeve 118 and carrier flange 120 are intermeshed. Thus, at least part of a spline of the first set of splines 132 of the sleeve 118 is hidden behind a spline of the third set of splines 136 of the carrier flange 120 because the first set of splines 132 of the sleeve 118 are engaged with the third set of splines 136 of the carrier flange 120. Further, at least part of a spline of the second set of splines 134 of the sleeve 118 is hidden behind a spline of the fourth set of splines 136 of the carrier flange 120 because the second set of splines 134 of the sleeve 118 are engaged with the fourth set of splines 138 of the carrier flange 120.

It is also noted that when the sleeve 118 is in an engaged position (FIG. 3B), the piston 108 is compressed against the spring 110, thereby decreasing an axial length of the spring 110, along a direction of motion of the piston 108, relative to when the sleeve 118 is in the disengaged position. Comparatively, when the sleeve 118 is in the disengaged position (FIG. 3A), the spring 110 is uncompressed, and thereby an axial length of the spring 110 is increased, along a direction of motion of the piston 108, relative to when the sleeve 118 is in the engaged position.

When the sleeve 118 is in the engaged position (FIG. 3B), the sleeve 118 rotates with the first axle shaft 104, and the carrier flange 120 rotates with both of the first axle shaft 104 and the sleeve 118. Therefore, torque is applied equally to axle shaft 104 and axle shaft 106, and vice-versa when both wheels are rotating at the same speed. Torque is applied fully to axle shaft 104 when axle shaft 106 is spinning freely. In some examples, the sleeve 118 rotates with the first axle shaft 104, the second axle shaft 106, and the carrier flange 120.

FIG. 4 illustrates a top, front, and left isometric view of the sleeve 118, according to some aspects described herein. The sleeve 118 includes a body 148 with a first axial end face 150 and a second axial end face 152. In some examples, the body 148 is a generally cylindrical body. The body 148 defines a central axis or axis of rotation 154. The body 148 may be radially symmetric about the axis of rotation 154. The axis of rotation 154 may extend through a center point (e.g., geometric center point) of the first face 150 and the second face 152.

The body 148 may further define an inner surface 156 and an outer surface 158. In some examples, the inner surface 156 is an inner circumferential surface and the outer surface 158 is an outer circumferential surface, for example, when the body 148 is a generally cylindrical body. The inner surface 156 defines a bore or cavity 160 within the body 148. The cavity 160 may extend through a width of the body 148. Further, the cavity 160 may extend through the first face 150 and the second face 152. Accordingly, the axis of rotation 154 extends through the cavity 160. Further, when assembled in an axle shaft assembly, such as the axle shaft assembly 100, the cavity 160 may receive the first axle shaft 104. Specifically, the first axle shaft 104 may extend through the cavity 160, thereby extending through the sleeve 118.

The body 148 includes the first set of splines 132 and the second set of splines 134. The first set of splines 132 protrude radially outward from the outer surface 158. Further, the first set of splines 132 are spaced apart and distributed about the axis of rotation 154. In some examples, the first set of splines 132 may be spaced apart about the axis of rotation 154 at a regular interval, such that, for example groups of two or more splines of the first set of splines 132 are diametrically opposed from other groups of splines having the same configuration.

The second set of splines 134 protrude radially outward from the outer surface 158. Further, the second set of splines 134 are spaced apart and distributed about the axis of rotation 154. In some examples, the second set of splines 134 may be spaced apart about the axis of rotation 154 at a regular interval, such that, for example groups of two or more splines of the second set of splines 134 are diametrically opposed from other groups of splines having the same configuration. The first and second sets of splines 132, 134 are spaced axially apart from each other, along the axis of rotation 154. As a result, the first and second sets of splines 132, 134 are also axially spaced apart from each other, along the length of the first axle shaft 104, when the sleeve 118 is assembled with the first axle shaft 104.

As best seen in FIG. 4, a chamfered edge 146 extends from outer surfaces of the first set of splines 132 toward the outer surface 158. Specifically, the chamfered edge 146 is positioned at the leading edge of the splines 132 and extends from the outer surfaces of the splines 132 downwardly and forwardly toward the outer surface 158, terminating between the first and second sets of splines 132, 134. The sleeve 118 may be sized and configured such that the chamfered edge 146 is the initial point of engagement with the carrier flange 120.

By engaging the chamfered edge 146 first, the first set of splines 132 engage with the carrier flange 120 before the second set of splines 134 as the sleeve 118 moves from the disengaged position (FIG. 3A) toward the engaged position (FIG. 3B). This allows for any debris generated by initial engagement (e.g., metal shavings or particles) to be evacuated away from side gear 124 by a flow of oil during operation. In particular, such debris may flow from the space between the sets of splines 132, 134 in a leftward direction, from the perspective shown in FIG. 1, when the sleeve 118 is in the disengaged position. Any other debris (e.g., dirt, dust, etc.) which may be present between the first and second sets of splines 132, 134 is also allowed to fall out, be removed, or otherwise be evacuated from the sleeve 118, in a similar fashion. By contrast, if second set of splines 134 were to engage with the carrier flange 120 before the first set of splines 132, then any resulting debris, such as metal shavings or particles, may get caught in the space between the sleeve 118 and the side gear 124 with no means of evacuation. In this way, the position and configuration of chamfered edge 146 increases performance and longevity of the axle shaft assembly 100.

In some examples, the body 148 further includes an inner set of splines 166. The inner set of splines 166 include a plurality of splines. The inner set of splines 166 extrude inward from the inner surface 156 (e.g., toward the axis of rotation 154). Further, the inner set of splines 166 are spaced apart about the axis of rotation 154. In some examples, the inner set of splines 166 may be spaced apart about the axis of rotation 154 at a regular interval, such that, for example groups of two or more splines of the inner set of splines 166 are diametrically opposed from other groups of splines having the same configuration.

The inner set of splines 166 extend across the axial extent of cylindrical body 148, with respect to the axis of rotation 154 (e.g., along the axis of rotation 154). In some examples, the inner set of splines 166 extend continuously across the cylindrical body, with respect to the axis of rotation 154. The inner set of splines 166 may rotatably fix the sleeve 118 with the axle shaft 104 by engaging with the first axle shaft 104 (e.g., splines on the first axle shaft 104), such that as the first axle shaft 104 rotates, torque is applied to the inner set of splines 166, to rotate the sleeve 118.

Figure 6:
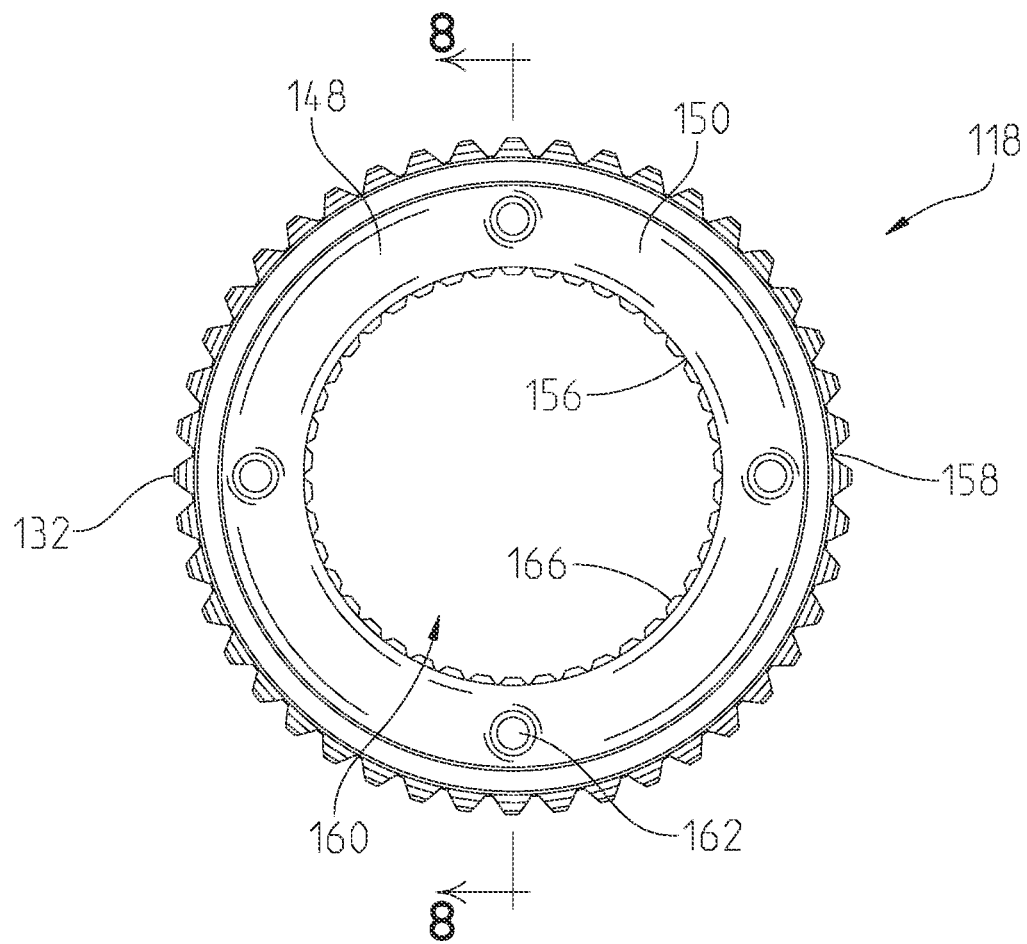
FIG. 6 illustrates a right-side elevational view of the sleeve of FIG. 3A, according to some aspects described herein.
Figure 9:
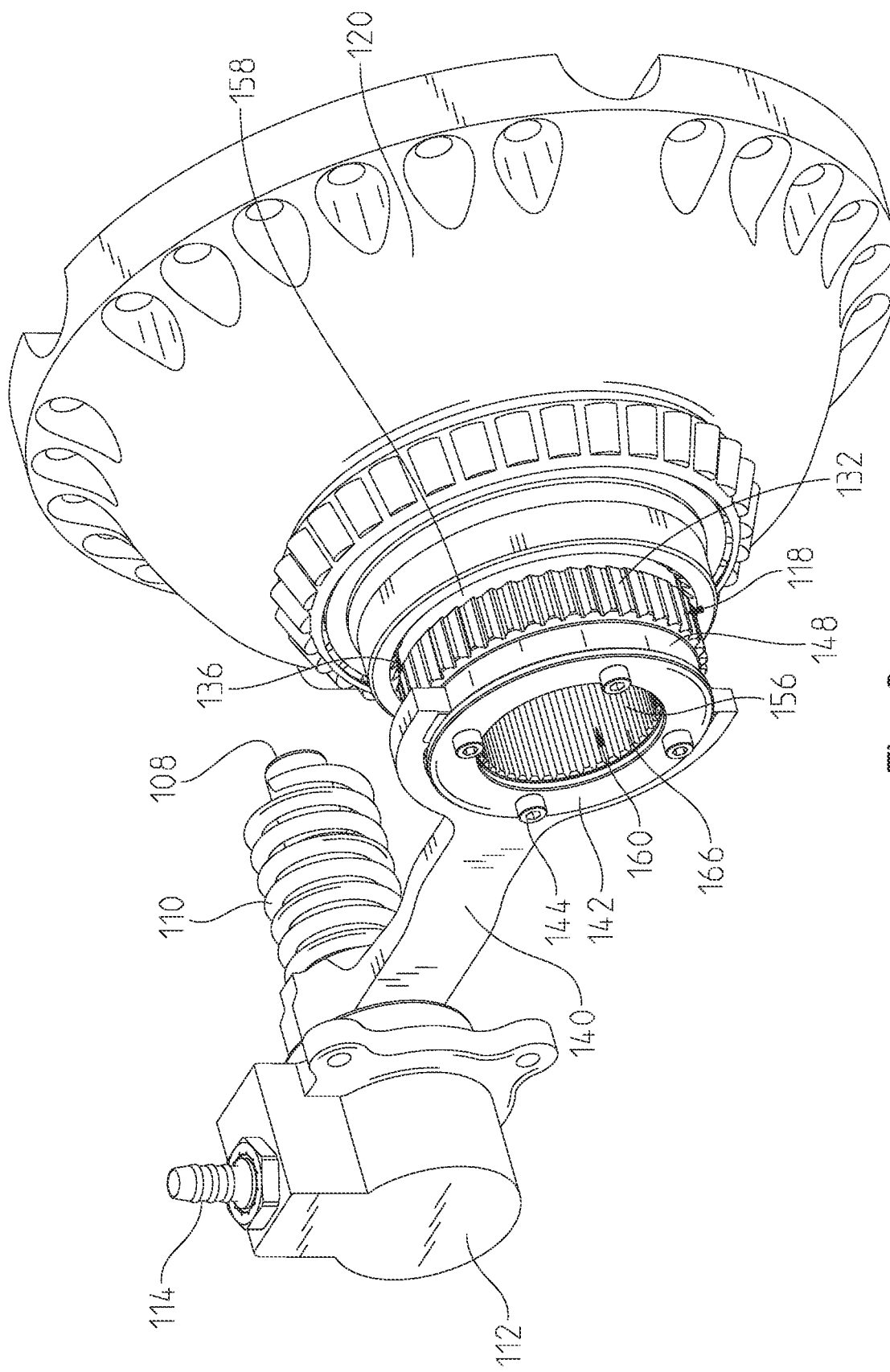
FIG. 9 illustrates a front, bottom, and right-side isometric view of aspects of the axle shaft assembly of FIG. 1.

FIG. 5 illustrates a left-side elevational view of the sleeve 118 and FIG. 6 illustrates a right-side elevational view of the sleeve 118, according to some aspects described herein. The first face 150 and the second face 152 of the body are generally circular. The first face 150 of the body 148 includes one or more holes 162 extending therethrough (FIG. 6), into the body 148. As shown in FIG. 9, the one or more holes 162 are configured to receive the fasteners 144 that couple the end plate 142 to the sleeve 118.

The second set of splines 134 may abut the second face 152. For example, the second set of splines extend into the second face 152. Comparatively, the first set of splines 132 are spaced apart from the first face 150. The first set of splines 132 are spaced apart from the first face 150 at a distance that is sized to receive the shift fork 140. By offsetting the first set of splines 132 form the first face 150, a distance between the end plate 142, which is coupled to the first face 150, and the first set of splines 132, is dimensioned to receive the shift fork 140.

Figure 8:
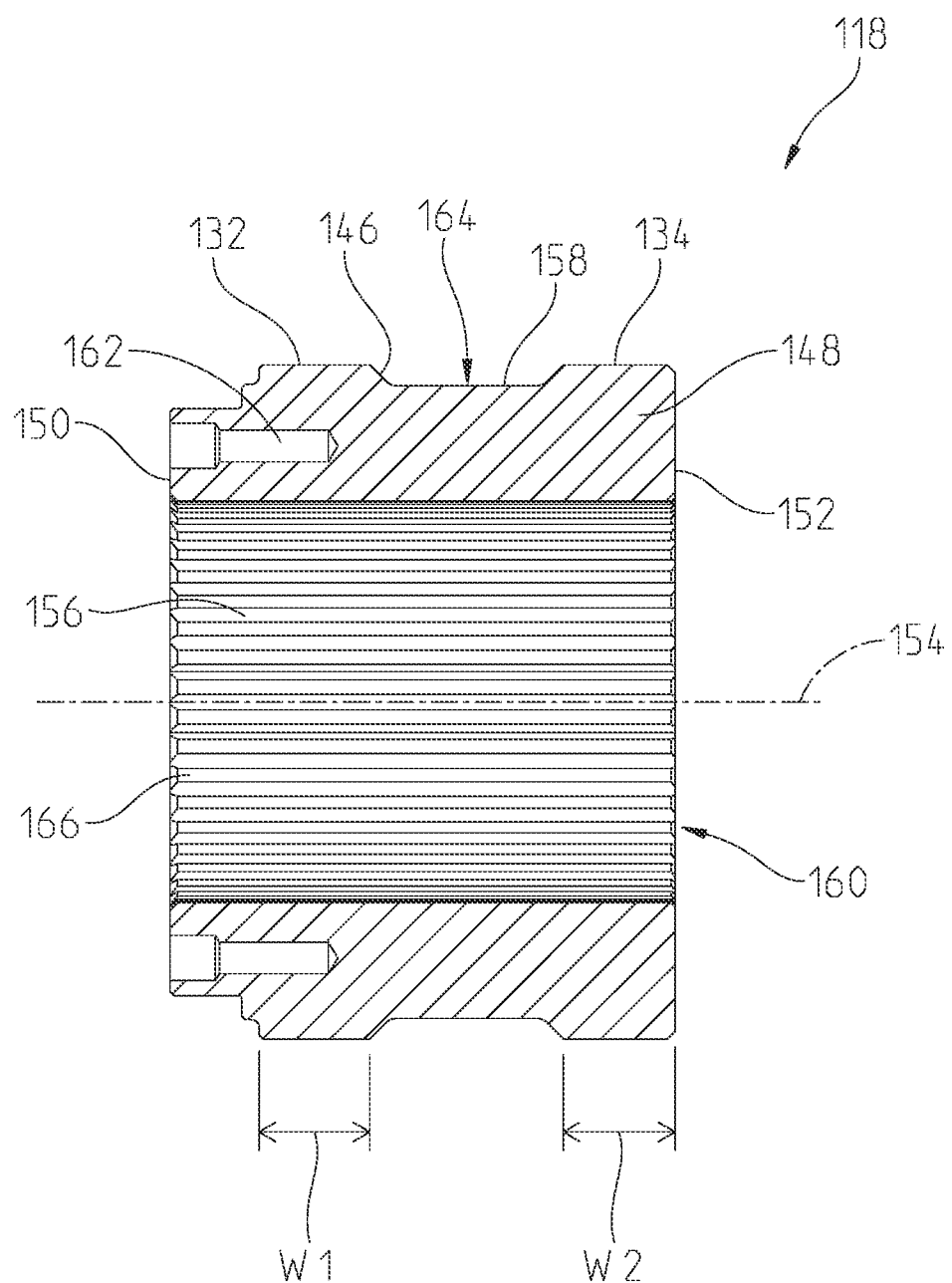
FIG. 8 illustrates a front cross-sectional elevation view of the sleeve of FIG. 3A, according to some aspects described herein.

FIG. 7 illustrates a front elevation view of the sleeve 118 of FIG. 3A, according to some aspects described herein and FIG. 8 illustrates a front cross-sectional elevation view of the sleeve 118, according to some aspects described herein. The first set of splines 132 and the second set of splines 134 extends radially outward from the outer surface 158 to substantially the same height, where height is taken from the perspective of FIGS. 7 and 8, and equals the radial distance from axis 154 to the outer surface of the splines 132, 134. In alternative example, the first and second sets of splines 132, 134 may extend outward from the outer surface 158 to different heights. Further one of ordinary skill in the art will recognize that corresponding engagement surface, such as on a carrier flange (e.g., carrier flange 120) and/or another component of a differential assembly (e.g., differential 122), for the first and second sets of splines 132, 134 may be sized and shaped to engage with the first and second sets of splines 132, 134, based on their respective heights from the outer surface 158.

In some examples a width W1 of the first set of splines 132 may be the same as a width W2 of the second set of splines 134. Additionally or alternatively, in some examples, the first set of splines 132 may have a width that is different than a width of the second set of splines 134. Further one of ordinary skill in the art will recognize that corresponding engagement surface, such as on a carrier flange (e.g., carrier flange 120) and/or another component of a differential assembly (e.g., differential 122), for the first and second sets of splines 132, 134 may be sized and shaped to engage with the first and second sets of splines 132, 134, based on their respective widths.

The first set of splines 132 and the second set of splines 134 define a valley 164 in the axial space between them. The chamfered edge 146 forms a portion (i.e., a wall) of the valley 164. The outer surface 158 forms another portion (i.e., a floor) of the valley 164. In some examples, the valley 164 extends continuously between the first set of splines 132 and the second set of splines 134. Alternatively, in some examples, there may be a plurality of valleys that extend between the first set of splines 132 and the second set of splines 134, such as in examples where additional sets of splines are disposed between the first and second sets of splines 132, 134 and/or in examples where the outer surface 158 extends curvedly and/or jaggedly from the first set of splines 132 to the second set of splines 134.

FIG. 9 illustrates a front, bottom, and right-side isometric view of aspects of the axle shaft assembly of FIG. 1. FIG. 9 illustrates an alternate view of the fitting 114 that extends from and/or through the cap 112. The shift fork 140 is shown to extend circularly about the piston 108. Further, an end of the shift fork 140 opposite of the piston 108 extends at least partially about the sleeve 118. The shift fork 140 coupled to the sleeve 118 between the end plate 142 and the first set of splines 132. The sleeve 118 is generally cylindrical and is received within a cavity of the carrier flange 120 that is also generally cylindrical. The cavity within the carrier flange 120 is sized and shaped to receive the sleeve 118.

Generally, in an axle shaft assembly, an amount of stroke for a shift fork may be limited by dimensions of an axle shaft housing (e.g., axle shaft housing 102) and a gear housing (e.g., the gear housing 128) of an axle shaft assembly. The sleeve 118 provided herein may accommodate the limited space for the shift fork 140 stroke, by providing the first set of splines 132 and the second set of splines 134 that extend outward from the outer surface 158 of the sleeve 118, are each spaced apart about an axis of rotation 154 of the sleeve 118, and that are spaced apart from each other, along the axis of rotation 154. The first and second sets of splines 132, 134 may increase (e.g., approximately double) an amount of spline engagement for every given length (e.g., one millimeter) of stroke, thereby improving the axle shaft assembly's 100 fatigue life.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A sleeve for an axle shaft, the sleeve comprising:
   a cylindrical body, the cylindrical body defining an axis of rotation about which the cylindrical body is radially symmetric, an inner circumferential surface, and an outer circumferential surface, the cylindrical body comprising:
   a first set of splines, the first set of splines protruding outward from the outer circumferential surface, and the first set of splines being spaced apart about the axis of rotation;
   a second set of splines, the second set of splines protruding outward from the outer circumferential surface, the second set of splines being spaced apart about the axis of rotation, and the first set of splines is axially spaced apart from the second set of splines, along the axis of rotation; and a chamfered edge extending from a leading edge of the first set of splines toward the outer circumferential surface, between the first and second set of splines, wherein the leading edge from which the chamfered edge extends is along an outermost surface of the first set of splines with respect to the axis of rotation, such that the chamfered edge intersects the outermost surface of the first set of splines;

wherein the first set of splines and the second set of splines are configured to engage with a third set of splines and a fourth set of splines, respectively, and wherein the chamfered edge is configured to engage the first set of splines with the third set of splines, before the second set of splines engages with the fourth set of splines.

2. The sleeve of claim 1, wherein the cylindrical body further comprises a fifth set of splines, the fifth set of splines protruding inward from the inner circumferential surface, and the fifth set of splines being spaced apart about the axis of rotation.

3. The sleeve of claim 2, wherein the cylindrical body further comprises a first radial face and a second radial face, and wherein the fifth set of splines extend continuously from the first radial face to the second radial face with respect to the axis of rotation.

4. The sleeve of claim 1, wherein the inner circumferential surface defines a cavity within the cylindrical body, the axis of rotation extending through the cavity.

5. The sleeve of claim 1, wherein the first set of splines and the second set of splines protrude outward from the outer circumferential surface to substantially the same height.

6. The sleeve of claim 1, wherein the first set of splines and the second set of splines define a valley in the space between which they are apart, the chamfered edge forming a portion of the valley.

7. An axle shaft assembly, the axle shaft assembly comprising:
a sleeve comprising:
a cylindrical body, the cylindrical body defining an axis of rotation about which the cylindrical body is radially symmetric, a first radial face, a second radial face, an inner circumferential surface extending axially from the first radial face to the second radial face, and an outer circumferential surface, the cylindrical body comprising:
a first set of splines, the first set of splines protruding outward from the outer circumferential surface, and the first set of splines being spaced apart about the axis of rotation and being spaced apart by an offset from the first radial face;
a second set of splines, the second set of splines protruding outward from the outer circumferential surface, the second set of splines being spaced apart about the axis of rotation, and the first set of splines is axially spaced apart from the second set of splines, along the axis of rotation; and
a third set of splines, the third set of splines protruding inward from the inner circumferential surface, the third set of splines extending continuously from the first radial face to the second radial face with respect to the axis of rotation, and the third set of splines being spaced apart about the axis of rotation, wherein the second set of splines and the third set of splines both abut the second radial face of the cylindrical body; and a shift fork having a first end coupled to the sleeve and a second end adapted for coupling with a piston used to provide motive force to the shift fork, the shift fork configured to shift from a first position to a second position, the first end of the shift fork circumferentially extending at least partially about the sleeve, the first end of the shift fork located in the offset between the first set of splines and the first radial face when the shift fork is in the first position and when the shift fork is in the second position.

8. The axle shaft assembly of claim 7, wherein the cylindrical body further comprises a chamfered edge, the chamfered edge extending from a leading edge of the first set of splines toward the outer circumferential surface, between the first and second set of splines.

9. The axle shaft assembly of claim 7, wherein the inner circumferential surface defines a cavity within the cylindrical body, the axis of rotation extending through the cavity.

10. The axle shaft assembly of claim 7, wherein the first set of splines and the second set of splines protrude outward from the outer circumferential surface to substantially the same height.

11. The axle shaft assembly of claim 7, wherein the first set of splines and the second set of splines define a valley in the space between which they are apart.

12. The axle shaft assembly of claim 7, wherein the first set of splines comprise an outer surface, and wherein the outer surface of the first set of splines is an outermost surface of the cylindrical body relative to the axis of rotation.

13. The axle shaft assembly of claim 7, further comprising an end plate positioned proximate to the first radial face and forming an abutment that radially extends above the offset, the shift fork located between the end plate and the first set of splines, the end plate configured to discourage removal of the shift fork from the cylindrical body.

14. The axle shaft assembly of claim 13, further comprising a carrier flange defining a cavity configured to receive the sleeve, the carrier flange further defining a fourth set of splines configured to engage one of the first set of splines and the second set of splines.

15. The axle shaft assembly of claim 14, further comprising a gear housing at least partially enclosing the sleeve and the fork and the carrier flange.

16. An axle shaft assembly comprising:
a carrier flange, the carrier flange being positioned about an axle shaft, the carrier flange comprising a first set of splines and a second set of splines;
a sleeve, the sleeve being positioned about the axle shaft, and the sleeve comprising:
a body, the body defining an inner surface, and an outer surface, the body comprising:
a third set of splines, the third set of splines protruding outward from the outer surface, and the third set of splines being spaced apart about the carrier flange;
a fourth set of splines, the fourth set of splines protruding outward from the outer surface, the fourth set of splines being spaced apart about the carrier flange, the third set of splines being axially spaced apart from the fourth set of splines, along a length of the axle shaft, wherein the third set of splines and the fourth set of splines are configured to engage with the first set of splines and the second set of splines, respectively; and a chamfered edge on the third set of splines, the chamfered edge being configured to engage the first set of splines with the third set of splines, before the second set of splines engages with the fourth set of splines.

17. The axle shaft assembly of claim 16, wherein the chamfered edge extends from a leading edge of the third set of splines toward the outer surface, between the third and fourth set of splines, and wherein the leading edge is along an outermost surface of the third set of splines.

18. The axle shaft assembly of claim 16, wherein the first set of splines are axially spaced apart from the second set of splines, along the length of the axle shaft.

19. The axle shaft assembly of claim 16, wherein the inner surface defines a cavity within the body, the axle shaft extending through the cavity.

20. The axle shaft assembly of claim 16, further comprising:

a piston that is configured to move between a first position and a second position; and a shift fork that is coupled to the piston and to the sleeve, the shift fork being configured to move the sleeve, when the piston moves between the first position and the second position, thereby locking or unlocking the sleeve with the carrier flange.

21. The axle shaft assembly of claim 16, wherein the axle shaft is a first axle shaft, and wherein the axle shaft assembly further comprises a second axle shaft, the sleeve being configured to transmit torque from the first axle shaft to the second axle shaft, via the carrier flange, when the sleeve is locked with the carrier flange.

22. The axle shaft assembly of claim 16, wherein the body of the sleeve is a cylindrical body, wherein the inner surface is an inner circumferential surface, and wherein the outer surface is an outer circumferential surface.

\* \* \* \* \*